COMPRESSION MOLDED
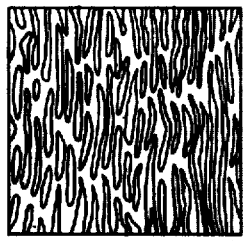
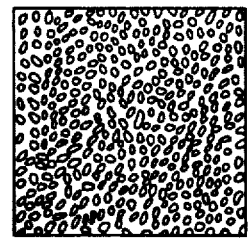
DIRECTION OF EXPANSION
Fig 1
Fig 2
EXTRUSION MOLDED
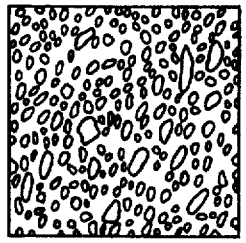
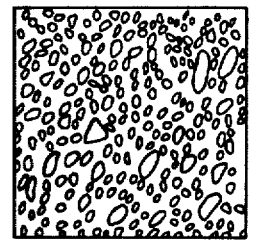
DIRECTION OF EXTRUSION
Fig 3
Fig 4
Fig 5
NO NUCLEI
*Robert E. Maier* INVENTOR.
BY *J. M. Beattie Jr.*
ATTORNEY Patented June 20, 1950

2,512,463

UNITED STATES PATENT OFFICE 2,512,463

CELLULAR PLASTIC PRODUCTS AND METHOD OF MAKING

Robert E. Maier, Upper Montclair, N. J., assignor to E. I. du Pont de Nemours & Company, Wilmington, Del., a corporation of Delaware Application May 28, 1946, Serial No. 672,811

10 Claims. (Cl. 106—122)

1

This invention relates to cellular plastic products and, more particularly, to cellular plastic products of low density and uniform character.

Heretofore, artificial sponge-like products of organic cellulose derivatives have been prepared by different methods. One method of preparing these sponge-like products involves incorporating a volatile liquid in the plastic mass prior to molding or other fabrication procedure and later causing the plastic mass to expand by the application of heat. While the prior art has suggested that pigments or various fillers may be incorporated in the plastic mass, prior to heating and expanding same, in order to obtain a colored product or to effect some modification of the physical characteristics of the product and may, in fact, have made sponge-like products containing pigments or fillers, there has never been any recognition heretofore that the presence of pigments or fillers had any influence on the size or distribution of the voids formed in the plastic mass.

These heretofore produced cellular products have sometimes been described as "sponge-like" products and, regardless of their other characteristics, they are all "sponge-like" in the sense that the voids in the plastic are quite irregular in size and distribution just as are the voids in natural sponges. However, attempts have been made in the past to produce low density plastic cellular products which are rigid and which possess small uniformly sized and distributed voids, e. g., a synthetic balsa-wood substitute, but without success. Despite the obvious demand for an artificial product of this type, the prior art has been unable to devise a practical means of controlling the pores or voids formed in the plastic to obtain uniformity in size or distribution in a low density product, i. e., one weighing less than about 8 lbs. per cu. ft.

A primary object of the present invention is the production of cellular products of organic cellulose derivatives possessing very low densities and high degrees of structural strength. A further object is the provision of plastic composites which may be employed to produce such cellular materials. Another object is to provide plastic products having extremely small voids or pores which are substantially uniform both as to size and distribution throughout a continuous plastic mass of an organic cellulose derivative. Still further objects of the invention are the production of cellular products having relatively high degrees of resiliency, resistance to creep under compression, and extremely low thermal conductivity, the provision of an expedient and practical method of control of the physical characteristics of the cellular structure in the production of such products, and the production of synthetic plastic products which will be competitive with balsa-wood. Other objects will be apparent from the description of the invention given hereinafter.

The above objects are accomplished according to the present invention by preparing a composite which is a discontinuous but uniform mixture essentially comprising, by weight, 100 parts of an organic cellulose derivative, 0.5 to 2.5 parts of a granular, water-insoluble, heat-stable powder substantially all passing a 100-mesh screen and retained on a 325-mesh screen and which is compatible with organic cellulose derivatives, and 10 to 25 parts of a volatile liquid which is a non-solvent for the cellulose derivative at 70° F. and a solvent therefor above about 160° F., heating this composite while maintained under a pressure in excess of the vapor pressure of the volatile liquid until the composite has reached a temperature of 250° F.–450° F. throughout and has become a continuous plastic mass, thereupon reducing the external pressure to below the vapor pressure of the volatile solvent, and cooling the resulting cellular product.

Preferably, the powder is of a particle size substantially all passing a 100-mesh screen and being retained on a 200-mesh screen and is selected from the group consisting of aluminum, copper, alumina, barium sulphate, zinc oxide, and mica, and is used in the proportion of approximately 0.8 to 1.5 parts per 100 parts of the cellulose derivative and the volatile liquid is used in the proportion of 10 parts to 15 parts per 100 parts of the cellulose derivative.

The present invention resides to an important extent in the discovery of the fact, totally unappreciated heretofore, that granular powder, within a quite limited range both as to proportions and particle size as indicated above, when used with a volatile liquid in a limited range of proportions, enormously facilitates the production of a low density cellular plastic having fine pores of unusual uniformity, both as to size and distribution, a product which heretofore could not be produced by any practical process. The individual particles of the powder function as nuclei for the formation of pores; this was known heretofore as a scientific fact but it was of no known use to the art in the production of cellular plastics of the type herein described. The use of pigments and ordinary granular fillers in the state they are customarily used in the plastic art are far too finely divided and, at least in the case of fillers, are normally used in a proportion far too great to be anything but a detriment in the production of a low density cellular product having uniform size and distribution of particles.

It has now been discovered that if a granular powder is employed in a proportion, by weight, of 0.5 to 2.5 parts per 100 parts of an organic cellulose derivative and the size of the particles is substantially between 100-mesh and 325-mesh, together with 10 to 25 parts of volatile liquid of the type herein disclosed, the production of a cellular product weighing less than 8 lbs. per cu. foot and having fine pores or voids generally less than 0.001 cu. inch in volume and of the greatest uniformity both in size and distribution, is a relatively simple and entirely practical operation. It is not an absolute requirement that all particles retained on a 100-mesh screen or passing a 325-mesh screen must be excluded but they can only be tolerated to a very small degree, i. e., 5% of the total at most, if a product practically adapted as a substitute for balsa-wood is to be obtained. In commercial operation, reasonable effort should be made to restrict the powder to particles coming within the specified range of mesh size.

Furthermore, the nuclei must be granular, water-insoluble, heat-stable particles which will not chemically react with and are incompatible with organic cellulose derivatives at all temperatures to which the plastic mixture may be subjected during the process. The preferred substances for use as pore-formation nuclei are those mentioned above but many others fulfilling these requirements will occur to those skilled in the art such as silicon dioxide, silica gels, silicon carbide, Fuller's earth, bronze, aluminum bronze, and brass. Still others, particularly metals such as iron, nickel, and zinc would be substantially as satisfactory except that they tend to be too active chemically under the conditions usually prevailing, that is, they tend to fall down in the requirement of being substantially chemically inert with respect to cellulose derivative plastics; if they are not too active chemically under the conditions of any given situation, then they may be used successfully. The nuclei should be incorporated homogeneously throughout the mixture in concentrations between about 0.5 to 2.5 parts, by weight, per 100 parts of the organic cellulose derivative and, preferably, in a concentration of approximately 0.8 to 1.5 parts.

While the incorporation of pore-formation nuclei in the composite prior to formation of a cellular product from the same insures that the voids produced in the cellular product will be of uniform size and distribution providing the correct proportion of nuclei of the correct size is used in combination with a volatile liquid in the correct proportions, deviation from the narrow range of nuclei proportions and particle size leads surprisingly quickly to results that are all but worthless or differing little, if at all, from the sponge-like products made heretofore. For example, if an appreciable proportion of the nuclei is larger than 100-mesh and/or if less than 0.5 parts per 100 parts of cellulose derivative are used, the size of the voids increases rapidly and, rather than getting an acceptable balsa-wood substitute, a coarse-pored, sponge-like product is obtained which closely resembles the product made with the omission of nuclei altogether. On the other hand, increasing the proportion of nuclei above 2.5 parts per 100 parts of cellulose derivative or using nuclei appreciably finer than 325-mesh results in an extremely fine-pored product which has not been expanded to any great extent and is substantially useless. By observing the limits herein specified, the optimum degree of expansion is insured and the product is uniform both as to size and distribution of the pores.

The employment of these nuclei in the production of cellular products of the type herein considered permits the size and number of voids and, in turn, the ultimate density of the cellular product to be controlled. All other things being equal, the number of voids formed by the process of this invention from any given composite is proportional to the number of nuclei employed per unit weight of composition. Also, all other things being equal, the degree of expansion which results in the plastic material during the process of cellular structure, and, hence, the ultimate density of the cellular mass, is dependent upon the size of the nuclei, the concentration of the nuclei and, to some extent, the specific material used as the nuclei.

The activity of the nuclei depends both upon the material of which they are composed and upon their shape. Thus, powdered aluminum metal of the preferred size is more active, thereby permitting the cellular material to be expanded further, than is powdered iron of identical size. On the other hand, aluminum metal powder of the preferred size but which possesses many sharp edges and irregular contours is more active and will produce greater expansion than the same metal powder of the same size which is substantially spherical in shape. The term "granular" is used throughout the specification and claims in its normal sense to denote a powder, the individual particles of which have greatest and least dimensions of somewhere near the same magnitude as contrasted to fibers or needle-like particles where the greatest dimension exceeds the least many times. The individual particles of the granular powder, however, may possess sharp edges and irregular contours and do not have to be substantially cubical or spherical in shape. Moreover, experimental work has shown that the higher the thermal conductivity and the higher the specific heat of the material used for the nuclei, the greater will be the extent of expansion which results during the process of this invention.

Despite the above discussed factors affecting the activity of the nuclei, it has been found that the use of 0.5 to 2.5 parts of nuclei per 100 parts, by weight, of cellulose derivative represents the practical range to produce a cellular product of outstanding quality regardless of the characteristics of the particular nuclei selected. Further, that the optimum proportion of nuclei will generally fall in the range of 0.8 to 1.5 parts of nuclei per 100 parts of cellulose derivative.

The volatile liquid component used in the composites of this invention serves two functions, namely, (1) to weld the plastic material together at the elevated temperature used in the process and (2) to expand the plastic mass in order to form the desired cellular structure. This volatile liquid must possess a relatively low degree of solvent action upon the organic cellulose derivative employed. Thus, at room temperatures (about 70° F.) and when used in the proportions adapted for this invention, it must permit the particles of organic cellulose derivatives to remain as discrete particles, i. e., as a discontinuous mixture rather than as a continuous plastic. On the other hand, it must possess sufficient solvent action at the elevated temperatures to be used, i. e., 250° F.–450° F., to weld the particles of the cellulose derivative completely to give a continuous plastic. Volatile liquids of this type are referred to in the art as solvents inactive at room temperatures. It is preferable that the volatile liquid component used should be sufficiently volatile to possess a vapor pressure of 150 pounds per square inch at the temperature of process operation.

The adaptability of a liquid for use in these composites may be tested by admixing 1 gram of the cellulose derivative to be used with 100 grams of the liquid. If the cellulose derivative remains as discrete, non-agglomerated particles at 70° F., but dissolves at a temperature of about 160° F., then the liquid may be employed in these composites, provided, of course, that it does not react with the cellulose derivative at temperatures as high as 450° F.

The volatile liquid may be a single compound or a mixture of one or more active solvents with various non-solvents miscible with these solvents in the required proportions. Mixtures of acetone and ethyl alcohol containing between 70%–100% of the latter and up to 30% of the former are preferred as the volatile liquid of composites when cellulose acetate having an acetic number of 52–53 is used as the plastic material, with a higher proportion of acetone being used with cellulose acetate of higher acetic number. However, various mixtures of active solvents for cellulose derivatives, e. g., lower aliphatic ketones, ethers, and esters, chloroform, ethylene dichloride, methyl chloride, benzene, and the like, together with various non-solvents miscible with the solvents, or inactive solvents, alone, e. g., lower aliphatic alcohols, may be successfully employed with cellulose esters and ethers.

The concentration of the liquid component in the composite should be between about 10 and 25 parts, by weight, per 100 parts of the cellulose derivative and, preferably, between 10 and 15 parts, per 100 parts of the cellulose derivative. If too large an amount of the liquid component be used, a gummy mass may result and the production of an acceptable cellular product would be practically impossible. Conversely, the use of insufficient amount of solvent will result in an unsatisfactory welding of the final structure and an undesirable and poor degree of expansion.

The present invention is generally applicable to organic cellulose derivatives. Cellulose esters and ethers and, in particular, cellulose esters of aliphatic monocarboxylic acids such as cellulose acetate, cellulose acetate butyrate, and the like, are preferred as the plastic component in the composites of this invention. Ethyl cellulose, benzyl cellulose and cellulose propionate may be mentioned as other cellulose derivatives that are suitable as the plastic portion of composites in this invention.

The most expedient method for compounding the composites herein considered comprises the simple admixture of the separate components in a powder mixture. To insure the production of homogeneous composites, it is preferred to employ plastic materials which are in the form of a powder or particles which are small enough to pass a ⅜ inch-mesh screen. These composites may also be prepared on mixing rolls, followed by comminution and the like, but since the control of liquid content is difficult in some cases, this method is not preferred.

Plasticizers may be incorporated in the cellulose derivatives. However, the incorporation of plasticizers generally adds nothing to and may distract from the physical properties which makes these cellular products especially desirable.

Specific embodiments of the invention are illustrated in the following examples wherein all proportions are by weight unless otherwise noted, reference being made to the accompanying drawing in which:

Fig. 1 represents a compression molded cellular product according to the present invention, viewed perpendicularly to the direction of expansion, the voids being shown in greatly enlarged proportions for purposes of illustration;

Fig. 2 represents the cellular product of Fig. 1 as viewed parallel to the direction of expansion;

Fig. 3 represents an extruded cellular product according to the present invention, viewed perpendicularly to the direction of extrusion;

Fig. 4 represents the cellular product of Fig. 3 as viewed parallel to the direction of extrusion;

Fig. 5 represents the type of product produced without the use of pore-formation nuclei.

*Example I*

100 parts of cellulose acetate granular powder having an acetic number of 52 to 53
13.7 parts of a solvent comprising 79% of ethyl alcohol and 21% of acetone which has been cooled to about 40° F.
1.0 part of alumina (200- to 300-mesh)

are introduced into a vapor-tight helical blade-type powder mixer and allowed to mix for one and one-half hours. After thoroughly mixing, the composite is placed in a compression molding die measuring 10 x 12 inches. The piston of the molding cylinder is then forced over the mixture with a pressure of about 1300 pounds per square inch. The composite is then heated to a temperature of approximately 300° F. by application of steam heat to the faces of the die. In about three minutes the piston is quickly moved out of the die a distance of one and one-half inches, thus reducing the pressure upon the molding mixture and allowing for the expansion of the heated and compressed composite. The steam heat in the die is then replaced with cold water to cool the contents of the mold. After the mold and its contents have reached approximately 70° F., the piston is further withdrawn so as to permit removal of the molded plastic from the die. The plastic mass after removal from the die is placed in a seasoning chamber in order to remove any volatile solvent which may be contained in the cellular structure.

A block of cellular cellulose acetate measuring 12 by 10 by 1½ inches and possessing a density of 5.5 pounds per cubic foot, after trimming, is produced by this procedure. This cellular product consists of a multitude of minute voids homogeneously dispersed throughout the continuous rigid plastic structure. These voids are of an elongated shape oriented in the direction of movement of the piston, i. e., the 1½ inch dimension, as illustrated in Figs. 1 and 2. They measure between $1/128$ and $1/16$ of an inch across their smallest diameter and between $1/64$ and $1/16$ of an inch along their longest dimension. The volume of the voids varies between about $1 \times 10^{-6}$ and $2 \times 10^{-5}$ cubic inches. The physical properties of the cellular product parallel to the direction of orientation are as follows:

Density _____ 5.5#/cub. ft.
Compressive
   strength/density
   ratio _____ 39
Modulus of
   elasticity _____ $6.0 \times 10^4$
Modulus of rigidity $2.4 \times 10^4$
Thermal
   conductivity ____ 0.40 B. t. u./sq. ft./hr./°F./in.
Coefficient of
   thermal
   expansion _____ $4 \times 10^{-5}$/°C.

The uniform and homogeneous character of the cellular product produced according to this Example I as compared to the best product obtainable without use of pore-formation nuclei is made evident by comparing Figs. 1 and 2 with Fig. 5 which represents the latter type product; the size of the voids in each figure is obviously greatly enlarged.

*Example II*

The following ingredients are mixed together for one and one-half hours in a vapor-tight helical blade-type powder mixer, in order to produce a homogeneous composite of the same.

100 parts cellulose acetate (52–53% acetic content, granular powder)
15.7 parts ethyl alcohol
4.3 parts acetone
1.0 part aluminum metal powder (100- to 200-mesh)

This composite is extruded from an extrusion machine at a temperature between 350° F. and 400° F. with a back pressure of 300 pounds per square inch in the form of a sheet between belts moving at a constant speed. The sheet is partially cooled while traveling between these belts. The partially cooled sheet is then seasoned for 10 to 20 minutes at 160° F. to 210° F. The cellular product which results, possesses a density of 3.3 pounds per cubic foot and is composed of substantially spherical voids dispersed completely uniformly throughout the continuous plastic mass as shown in Figs. 3 and 4. The size of these voids varies between the limits $1/64$ and $1/128$ of an inch in diameter and the volume of the voids varies between about $2 \times 10^{-6}$ and $2.5 \times 10^{-7}$ cubic inches.

*Example III*

The composite of Example II is extruded as in Example II except that the extrusion machine is equipped with a very long extrusion nozzle. At the start of the extrusion, this nozzle is inserted into a hollow article which is to be filled with cellular material. The heated composite is extruded from the machine with a back pressure of approximately 300 pounds per square inch through the long nozzle into the hollow piece. This piece is synchronously moved away from the extrusion nozzle as it becomes filled with the cellular material in such a manner as to maintain a pressure of about 2 pounds per square inch on the exit side of the extrusion nozzle.

*Example IV*

A homogeneous mixture of the following components is prepared as indicated in Example II.

100 parts commercial acetate molding powder (53% acetic content)
5 parts acetone
18.8 parts ethyl alcohol
1.25 parts aluminum metal powder (100-to-200 mesh)

A compacted preform of this mixture is then prepared. This preform possesses dimensions corresponding to, but proportionately smaller than a hollow article which it is desirable to fill with cellular material. A suitable adhesive is applied to the inner surface of the hollow piece to be filled, and thereafter, the preform is inserted into the hollow piece. The hollow article and its contents are then placed in an autoclave and subjected to 300 pounds per square inch pressure of carbon dioxide. The assembly is then heated until the preform attains a temperature of about 310° F.–320° F. When the preform has uniformly attained this temperature, the gas pressure upon it is suddenly released. The assembly is then cooled and removed from the autoclave. The previous hollow article is now filled uniformly with a cellular plastic of a density of about 3 pounds per cubic foot, the plastic having very uniform voids of about $1/16$ of an inch in diameter distributed uniformly throughout it.

This example illustrates a preferred procedure for producing massive cellular bodies according to this invention. If it is desired to obtain the cellular body without the external shell, the same procedure is followed except that the adhesive is omitted, thus enabling the cellular body to be removed readily.

*Example V*

The following composition is dry blended to give a uniform mixture:

100 parts cellulose acetate (52–53% acetic content, granular powder)
8.5 parts ethyl alcohol
2.4 parts acetone
0.7 part water
2.1 parts barium sulphate (100- to 200-mesh)

This composite is extruded as in Example II. The cellular product which results possesses a density of 6 pounds per cubic foot and is composed of substantially spherical voids dispersed completely throughout the continuous plastic mass.

*Example VI*

The following composite is molded as in Example I:

100 parts cellulose acetate (52–53% acetic content, granular powder)
8.8 parts ethyl alcohol
2.4 parts acetone
0.8 part powdered copper metal (200- to 325-mesh)

A cellular plastic block is thus formed which, when trimmed of the outer skin, possesses a density of approximately 7 pounds per cubic foot. This cellular product is composed of fine voids distributed uniformly throughout the plastic.

*Example VII*

The following composite was dry blended to give a uniform mixture and molded as in Example I:

100 parts cellulose acetate (52-53% acetic content, granular powder)
5.3 parts acetone
19.7 parts ethyl alcohol
1.0 part alumina (100- to 200-mesh)

The cellular block thus formed, after trimming, had a density of approximately 4.5 pounds per cubic foot and was characterized by fine voids uniformly distributed throughout the continuous plastic mass. The product was entirely suitable as a balsa-wood substitute.

To illustrate the danger of disregarding the limits as to the proportions and particle size of the pore-formation nuclei, variations of Example VII are given below:

Example VII-A

The procedure of Example VII was followed except the alumina particles were of such size that they all passed through a 40-mesh screen, 80% were retained on an 80-mesh screen, and the remainder retained on a 100-mesh screen. The cellular block produced was expanded to a satisfactory degree but instead of fine uniformly distributed pores in the product there were coarse, irregular pores not distributed at all uniformly; Fig. 5 illustrates a section of this product on an enlarged scale. The nuclei in this example were entirely too large to produce an acceptable balsa-wood substitute.

Example VII-B

The procedure of Example VII was again followed except that the alumina particles (100- to 200-mesh) were used in the proportion of 4.04 parts per 100 parts of the cellulose acetate. With this excessive proportion of nuclei the plastic expanded poorly and the pores were exceeding fine. Such a product might have been acceptable as far as the pore structure is concerned if a satisfactory degree of expansion could be effected but with this proportion of nuclei the plastic will not expand sufficiently to fill the mold after the piston is raised so that a worthless, irregular-shaped mass of considerably higher density than desired results.

Example VII-C

The procedure of Example VII was once more followed except that the alumina particles, although used in the proportions of Example VII, were of such size that they passed through a 325-mesh screen. The product thus obtained was similar to that of Example VII-B, that is, the pores were exceedingly fine and the expansion of the plastic was very poor.

The above Example VII and Examples VII-A to VII-C clearly show the importance of using the correct proportion of nuclei of the correct particle size.

Example VIII

The following composite was dry blended to give a uniform mixture and molded as in Example I:

100 parts cellulose acetate (52-53% acetic content, granular powder)
4.5 parts acetone
17 parts ethyl alcohol
1.5 parts fuller's earth (100- to 200-mesh)

The cellular block thus formed, after trimming, had a density of about five pounds per cubic foot and was highly acceptable both as to degree of expansion and uniformity of size and distribution of pores.

Example IX

The following composite was dry blended to give a uniform mixture and molded as in Example I:

100 parts cellulose acetate (52-53% acetic content, granular powder
5.3 parts acetone
19.5 parts ethyl alcohol
2.0 parts fuller's earth (100- to 200-mesh)

The cellular block thus formed was quite similar to that of Example VII and entirely acceptable as a product to be used in many places where balsa-wood has been used heretofore.

It will be understood that the above examples are merely illustrative and that the present invention is not limited to the particular manipulative procedures disclosed in the examples although such procedures are the preferred ones for maintaining the composites under pressure while being heated and thereafter reducing the pressure. Mesh sizes throughout are based on the Standard Screen Scale as given in the American Chemical Society Year Book, 1921-1922.

The procedure of the present invention broadly comprises heating the composite while it is maintained under a pressure in excess of the vapor pressure of the volatile liquid component of the composite until the composite has reached a temperature of 250° F.–450° F. throughout and has become a continuous plastic mass, thereupon reducing the external pressure to below the vapor pressure of the volatile component and cooling the resultant cellular product.

The nature of the apparatus used in the execution of these steps is not critical but may take various forms as is apparent from the foregoing examples. Thus, compression molding or extrusion molding apparatus similar to that used by the trade may be employed.

The present invention makes possible the production of cellular products not heretofore attainable artificially from plastic materials, i. e., cellular plastic materials possessing a density less than 8 pounds per cubic foot and composed of uniformly sized voids less than 0.001 cubic inch in volume which are completely uniformly distributed throughout the continuous plastic mass. Further, this invention provides a means for the production of cellular products of predetermined density. That is, the density of the cellular products may be regulated by controlling the extent of expansion of the composite during the process of molding or extruding. The expansion is controlled by regulating the temperature to which the composite is raised prior to expansion, by varying the liquid component of the composite, by varying the pressure differential upon the composite before and after expansion, and by varying the activity of the nuclei used in the composite.

The cellular structures made by the present invention are characterized in possessing low densities, high structural strength, high resiliency, low creep in compression, and extremely low heat conductivity. Since the formation of the cellular products according to this invention is preferably carried out without recourse to the use of plasticizers for the plastic materials, these products may possess a high unmolding temperature. Nevertheless, it is possible to form curved shapes from flat cellular sheets produced by this invention by employing the sheet forming techniques which have been developed for other plastic sheets such as polymethyl methacrylate, by operating at temperatures between 390° F. and 415° F. The products of this invention are extremely useful as heat and sound insulation material, for the filling of various airplane parts such as propeller tips, wing sections and the like, and as a substitute for balsa-wood. A particular advantage of the invention is that it permits poor grades of cellulose derivative flake which would otherwise have to be scrapped, to be used for the production of useful and commercially important articles.

In many uses the low specific density is one of the most highly valued characteristics of the cellular products of this invention. However, in certain applications where low density is not of importance, this cellular product is nevertheless peculiarly valuable. For example, articles like dolls' heads may be made by simply molding a block of this cellular product in a die, with or without heat, and covering the molded head with a skin or, if desired, by simultaneously shaping the cellular product into a doll's head and covering it. Some increase in density is a necessary consequence of the molding operation but this increase is of no importance in a doll's head; it is the extreme ease in molding the product that adapts it for this use.

The present application is a continuation-in-part of application Serial No. 507,472, filed October 23, 1943, now abandoned, in the name of the present applicant and entitled "Cellular Plastic Products."

As many apparently widely different embodiments of this invention may be made without departing from the spirit and scope thereof, it is to be understood that the invention is not limited to the specific embodiments thereof except as defined in the appended claims.

I claim:

1. A composite adapted to be converted into a cellular product, said composite being a discontinuous but uniform mixture comprising, by weight, approximately 100 parts of an organic cellulose derivative from the group consisting of cellulose ethers and cellulose esters of aliphatic monocarboxylic acids, 0.5–2.5 parts of a granular, water-insoluble, heat-stable powder substantially passing a 100-mesh screen and being retained on a 325-mesh screen, said powder being both incompatible with and chemically inert with respect to cellulose derivative plastics, and 10–25 parts of a volatile liquid which is a non-solvent for said cellulose derivative at 70° F. and a solvent therefor at 160° F.

2. A composite adapted to be converted into a cellular product, said composite being a discontinuous but uniform mixture comprising, by weight, approximately 100 parts of cellulose acetate, 0.5–2.5 parts of a granular, water-insoluble, heat-stable powder substantially passing a 100-mesh screen and being retained on a 325-mesh screen, said powder being both incompatible with and chemically inert with respect to cellulose acetate plastics, and 10–25 parts of a volatile liquid which is a non-solvent for said cellulose acetate at 70° F. and a solvent therefor at 160° F.

3. A composite adapted to be converted into a cellular product, said composite being a discontinuous but uniform mixture comprising, by weight, approximately 100 parts of an organic cellulose derivative from the group consisting of cellulose ethers and cellulose esters of aliphatic monocarboxylic acids, 0.8–1.5 parts of a granular, water-insoluble, heat-stable powder substantially passing a 100-mesh screen and being retained on a 325-mesh screen, said powder being both incompatible with and chemically inert with respect to cellulose derivative plastics, and 10–15 parts of a volatile liquid which is a non-solvent for said cellulose derivative at 70° F. and a solvent therefor at 160° F.

4. A composite adapted to be converted into a cellular product, said composite being a discontinuous but uniform mixture comprising, by weight, approximately 100 parts of cellulose acetate, 0.8–1.5 parts of a granular, water-insoluble, heat-stable powder substantially passing a 100-mesh screen and being retained on a 325-mesh screen, said powder being both incompatible with and chemically inert with respect to cellulose acetate plastics, and 10–15 parts of a volatile liquid which is a non-solvent for said cellulose acetate at 70° F. and a solvent therefor at 160° F.

5. A composite adapted to be converted into a cellular product, said composite being a discontinuous but uniform mixture comprising, by weight, approximately 100 parts of an organic cellulose derivative from the group consisting of cellulose ethers and cellulose esters of aliphatic monocarboxylic acids, 0.5–2.5 parts of a granular, water-insoluble, heat-stable powder substantially passing a 100-mesh screen and being retained on a 200-mesh screen, said powder being both incompatible with and chemically inert with respect to cellulose derivative plastics, and 10–25 parts of a volatile liquid which is a non-solvent for said cellulose derivative at 70° F. and a solvent therefor at 160° F.

6. A composite adapted to be converted into a cellular product, said composite being a discontinuous but uniform mixture comprising, by weight, approximately 100 parts of cellulose acetate, 0.8–1.5 parts of a granular, water-insoluble, heat-stable powder substantially passing a 100-mesh screen and being retained on a 200-mesh screen, said powder being both incompatible with and chemically inert with respect to cellulose acetate plastics, and 10–25 parts of a volatile liquid which is a non-solvent for cellulose acetate at 70° F. and a solvent therefore at 160° F.

7. A composite adapted to be converted into a cellular product, said composite being a discontinuous but uniform mixture comprising, by weight, approximately 100 parts of cellulose acetate, 0.5–2.5 parts of aluminum metal powder substantially passing a 100-mesh screen and being retained on a 325-mesh screen, and 10–25 parts of a volatile liquid which is a non-solvent for cellulose acetate at 70° F. and a solvent therefor at 160° F.

8. A composite adapted to be converted into a cellular product, said composite being a discontinuous but uniform mixture comprising, by weight, approximately 100 parts of cellulose acetate, 0.5–2.5 parts of alumina powder substantially passing a 100-mesh screen and being retained on a 325-mesh screen, and 10–25 parts of a volatile liquid which is a non-solvent for cellulose acetate at 70° F. and a solvent therefor at 160° F.

9. Process of preparing a cellular product which comprises heating a discontinuous but uniform mixture comprising, by weight, approximately 100 parts of an organic cellulose derivative from the group consisting of cellulose ethers and cellulose esters of aliphatic monocarboxylic acids, 0.5–2.5 parts of a granular, water-soluble, heat-stable powder substantially passing a 100-mesh screen and being retained on a 325-mesh screen, said powder being both incompatible with and chemically inert with respect to cellulose derivative plastics, and 10-25 parts of a volatile liquid which is a non-solvent for said cellulose derivative at 70° F. and a solvent therefor of 160° F., under a pressure in excess of the vapor pressure of said volatile liquid until such mixture has reached a temperature of 250° F.–450° F. throughout and has become a continuous plastic mass, thereupon reducing the external pressure to below the vapor pressure of said volatile liquid, and cooling the resulting cellular product.

10. Process of preparing a cellular product which comprises heating a discontinuous but uniform mixture comprising, by weight, approximately 100 parts of cellulose acetate, 0.5-2.5 parts of a granular, water-insoluble, heat-stable powder substantially passing a 100-mesh screen and being retained on a 325-mesh screen, said powder being both incompatible with and chemically inert with respect to cellulose acetate plastics, and 10-25 parts of a volatile liquid which is a non-solvent for cellulose acetate at 70° F. and a solvent therefor at 160° F., under a pressure in excess of the vapor pressure of said volatile liquid until such mixture has reached a temperature of 250° F.–450° F. throughout and has become a continuous plastic mass, thereupon reducing the external pressure to below the vapor pressure of said volatile liquid, and cooling the resulting cellular product.

ROBERT E. MAIER.

REFERENCES CITED

The following references are of record in the file of this patent:

UNITED STATES PATENTS

| Number | Name | Date |
|---|---|---|
| 2,242,372 | Schneider | May 20, 1941 |